(12) United States Patent
Liang et al.

(10) Patent No.: US 8,693,957 B2
(45) Date of Patent: Apr. 8, 2014

(54) SIGNAL TRANSCEIVING MODULE

(75) Inventors: Chih-Chuan Liang, Hsinchu (TW); Shun-An Yang, Hsinchu County (TW); Chung-Yen Wu, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 179 days.

(21) Appl. No.: 13/101,157

(22) Filed: May 5, 2011

(65) Prior Publication Data

US 2012/0282865 A1 Nov. 8, 2012

(51) Int. Cl.
*H04B 17/00* (2006.01)

(52) U.S. Cl.
USPC ......... 455/67.11; 455/67.14; 455/69; 455/73; 455/226.1; 455/226.2; 455/226.3

(58) Field of Classification Search
USPC .............. 455/67.11, 67.12, 67.14, 68, 69, 73, 455/115.1–115.4, 226.1–226.4; 370/328, 370/338
See application file for complete search history.

(56) References Cited

U.S. PATENT DOCUMENTS

| 2008/0130599 A1* | 6/2008 | Horikoshi et al. ............ 370/338 |
| 2008/0318540 A1* | 12/2008 | Homan et al. ............. 455/277.1 |

* cited by examiner

*Primary Examiner* — Junpeng Chen
(74) *Attorney, Agent, or Firm* — Winston Hsu; Scott Margo

(57) ABSTRACT

A signal transceiving module includes: a first antenna; a first signal port; and a first processing circuit coupled to the first signal port and arranged to detect a first signal quality of a first received signal received from the first signal port and determine if the first antenna is coupled to the first signal port correctly according to at least the first signal quality.

15 Claims, 13 Drawing Sheets

SIGNAL TRANSCEIVING MODULE

BACKGROUND

The present invention relates to a signal transceiving module, and more particularly to a signal transceiving module capable of determining if an antenna is coupled to a signal port correctly.

In a wireless communication system, the antenna is coupled to the power amplifier (PA) of the transmitter when the wireless transceiver performs the operation of transmitting signals, and the antenna is coupled to the receiver (e.g., a low-noise amplifier of the receiver) when the wireless transceiver performs the operation of receiving signals. Therefore, the antenna is controlled to connect to the transmitter or the receiver when the wireless transceiver is under normal operation. Usually, the antenna is externally coupled to the main circuit of the wireless transceiver. If the antenna is not coupled to the main circuit of the wireless transceiver correctly in the manufacturing process, such as in cases where the antenna is only partially connected to the main circuit or completely disconnected from the main circuit, then the radio frequency signal may not be able to be received by the receiver or only a partial power of the radio frequency signal can be received. Furthermore, the pre-transmitted signal generated by the power amplifier of the transmitter may also not be able to be transmitted to the antenna or only a partial pre-transmitted signal can be transmitted. More seriously, the entire or a partial pre-transmitted signal generated by the transmitter may be reflected to the power amplifier and may consequently burn out the power amplifier or deteriorate its performance if the reflected power is large enough. Therefore, providing a mechanism for protecting the power amplifier from burning out when the antenna is not coupled correctly to the main circuit of the wireless transceiver has become an important issue in the field of wireless communication systems.

SUMMARY

One of the objectives of the present embodiment is to provide a signal transceiving module capable of determining if an antenna is coupled to a signal port correctly.

According to an embodiment of the present invention, a signal transceiving module is disclosed. The signal transceiving module comprises a first antenna, a first signal port, and a first processing circuit. The first processing circuit is coupled to the first signal port and is arranged to detect a first signal quality of a first received signal received from the first signal port and determine if the first antenna is coupled to the first signal port correctly according to at least the first signal quality.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
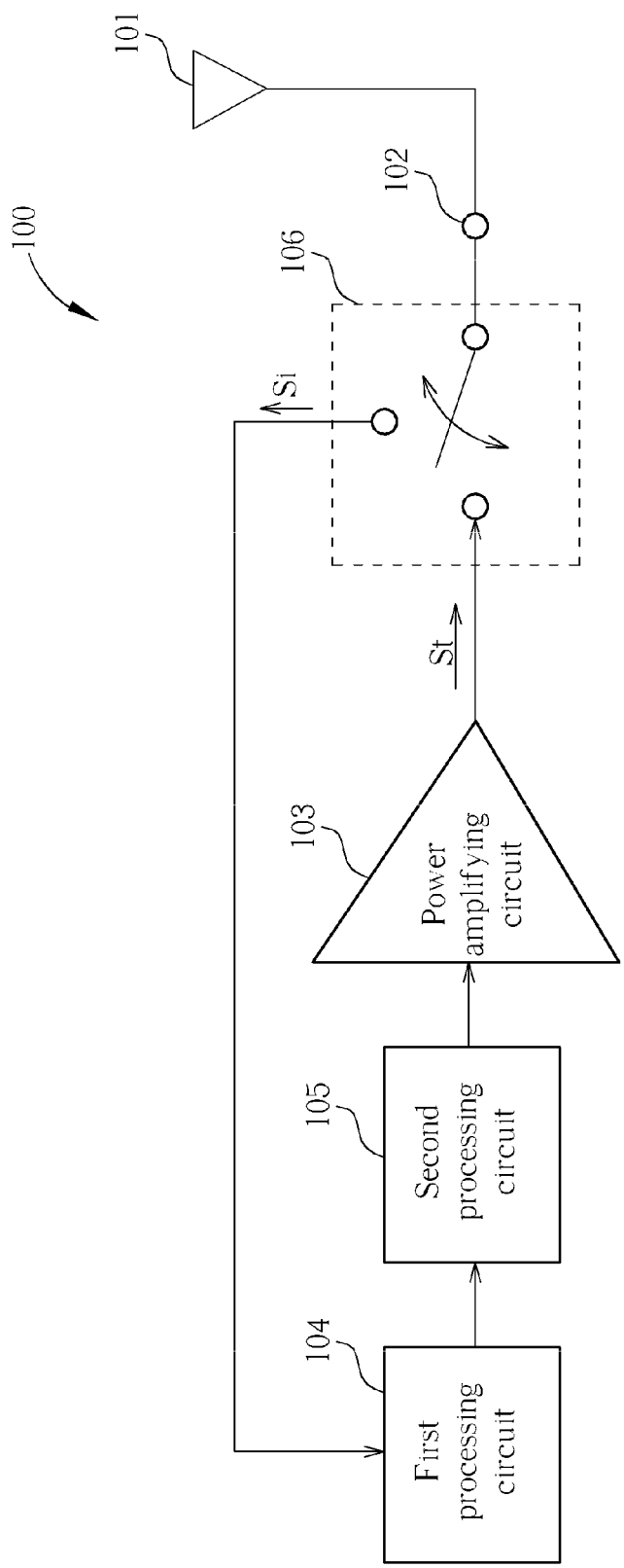
FIG. 1 is a diagram illustrating a signal transceiving module according to a first embodiment of the present invention.

Please refer to FIG. 1. FIG. 1 is a diagram illustrating a signal transceiving module 100 according to a first embodiment of the present invention. The signal transceiving module 100 comprises an antenna 101, a signal port 102, a power amplifying circuit 103, a first processing circuit 104, a second processing circuit 105, and a switching circuit 106. The first processing circuit 104 is coupled to the signal port 102 and arranged to detect a signal quality of a received signal Si1 received from the signal port 102 and determine if the antenna 101 is coupled to the signal port 102 correctly according to at least the signal quality. The power amplifying circuit 103 is coupled to the signal port 102 and arranged to generate a transmitting signal when the signal transceiving module 100 is under the transmitting mode. The signal quality of the received signal Si1 can be a received signal strength indication (RSSI), a physical carrier to interference-plus-noise ratio (PCINR), or a signal-to-noise ratio (SNR) of the first received signal.

In this embodiment, the first processing circuit 104 may be a receiver and the second processing circuit 105 may be a transmitter. When the signal transceiving module 100 is under the receiving mode, the first processing circuit 104 detects if the signal quality is lower than a predetermined quality level, and the first processing circuit 104 determines that the antenna 101 is not coupled to the signal port 102 correctly when the signal quality is lower than the predetermined quality level. Then, when the first processing circuit 104 detects that the antenna 101 is not coupled to the signal port 102 correctly and the power amplifying circuit 103 is not to be used in a normal operation (e.g., the transmitting mode) of the signal transceiving module 100, the first processing circuit 104 stops the first power amplifying circuit 103 from generating the transmitting signal St. When the first processing circuit 104 detects that the antenna 101 is not coupled to the signal port 102 correctly and the power amplifying circuit 103 is to be used in a normal operation (e.g., the transmitting mode) of the signal transceiving module 100, the first processing circuit 104 limits a maximum power of the transmitted signal St1 to a predetermined power level. Therefore, the switching circuit 106 is utilized to couple the antenna 101 to the first processing circuit 104 for receiving the received signal Si, or couple the antenna 101 to the power amplifying circuit 103 for transmitting the transmitted signal St.

In addition, when the first processing circuit 104 detects that the signal quality is higher than a predetermined quality level, the first processing circuit 104 determines that the antenna 101 is coupled to the signal port 102 correctly. In this case, the first processing circuit 104 stops detecting the signal quality of the received signal Si. It should be noted that, when the antenna 101 is coupled to the signal port 102 correctly (i.e., the impedance at the signal port 102 is matched), the power of the received signal Si1 can be transmitted to the first processing circuit 104 without loss (or within an acceptable range of loss), and the power of the transmitted signal St1 can be transmitted to the antenna 101 without reflection (or within an acceptable range of reflection). When the antenna 101 is not coupled to the signal port 102 correctly (i.e., the impedance at the signal port 102 is not matched), e.g., the cases where the antenna 101 is only partially connected to or improperly connected to the signal port 102 or completely disconnected from the signal port 102, the power of the received signal Si1 may not be transmitted to the first processing circuit 104 with an acceptable power, and the power of the transmitted signal St1 may not be totally transmitted to the antenna 101, consequently causing power to be reflected to the power amplifying circuit 103. Therefore, by controlling the power amplifying circuit 103 to stop generating the transmitting signal St1, or limiting the maximum power of the transmitted signal St1 to the predetermined power level when the first processing circuit 104 detects that the antenna 101 is not coupled to the signal port 102 correctly, the power amplifying circuit 103 can be prevented from burning out or deterioration.

Figure 2:
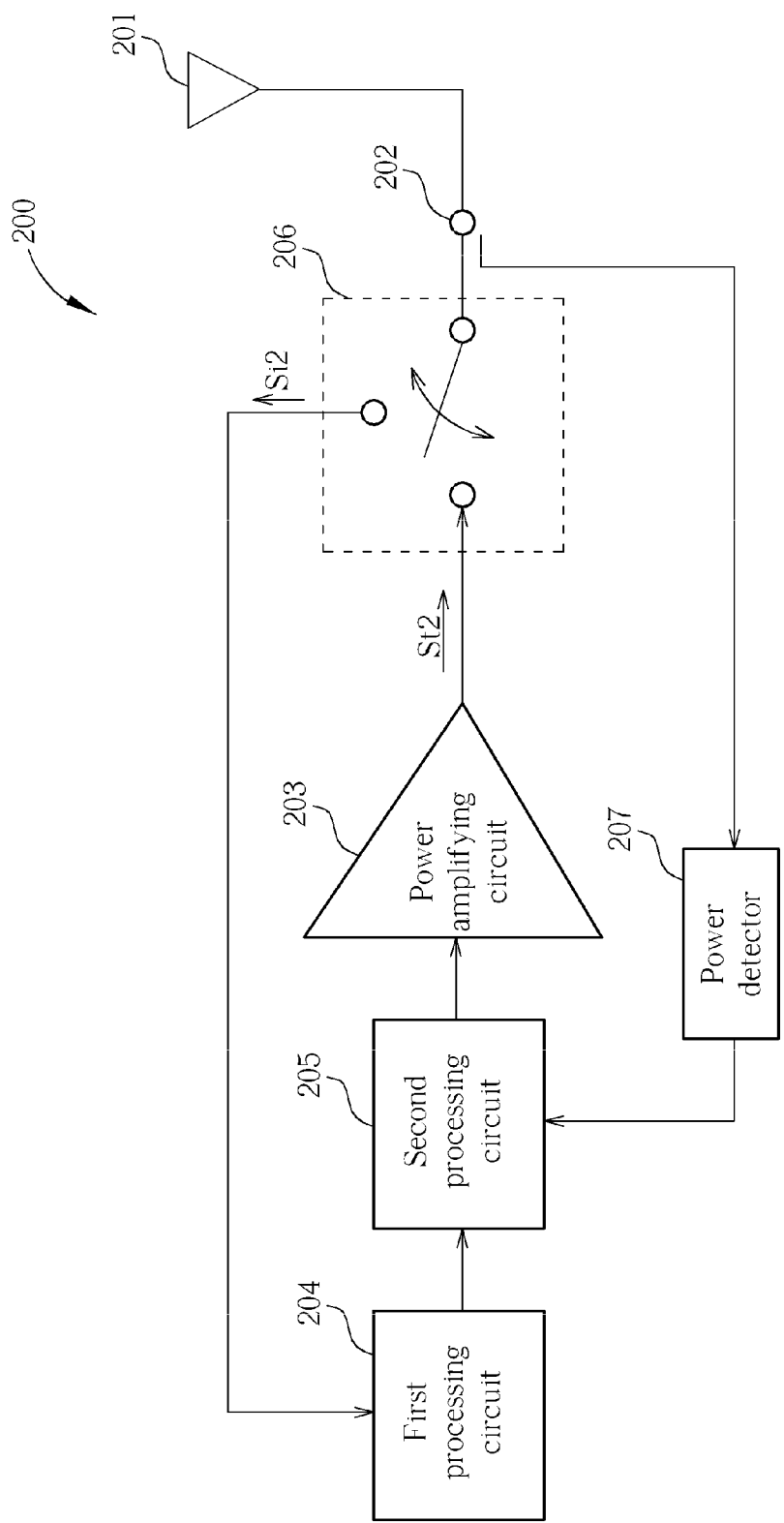
FIG. 2 is a diagram illustrating a signal transceiving module according to a second embodiment of the present invention.

Please refer to FIG. 2. FIG. 2 is a diagram illustrating a signal transceiving module 200 according to a second embodiment of the present invention. The signal transceiving module 200 comprises an antenna 201, a signal port 202, a power amplifying circuit 203, a first processing circuit 204, a second processing circuit 205, a switching circuit 206, and a power detector 207. In this embodiment, the switching circuit 206 is arranged to selectively couple the signal port 202 to the first processing circuit 204 (e.g., a receiver) or the power amplifying circuit 203, wherein the first processing circuit 204 determines if the antenna 201 is coupled to the signal port 202 correctly as described in the first embodiment (i.e., the signal transceiving module 100), and when the first processing circuit 204 determines that the antenna 201 is not coupled to the signal port 202 correctly, the switching circuit 206 couples the signal port 202 to the power amplifying circuit 203. The second processing circuit 205 (e.g., a transmitter), which is coupled to the power amplifying circuit 203, is arranged to control the power amplifying circuit 203 to output the transmitting signal St2 having a first predetermined power level to the signal port 202 when the power amplifying circuit 203 is coupled to the signal port 202.

The power detector 207, which can be a low-pass filter coupled to the second processing circuit 205 and a square law unit and the square law unit further coupled to the signal port 202, is arranged to detect a power level at the signal port 202 when the power amplifying circuit 203 outputs the transmitting signal St2. The second processing circuit 205 further determines if the power amplifying circuit 203 is coupled to the antenna 201 correctly according to a power difference between the power level of the transmitting signal St2 and the first predetermined power level. When the second processing circuit 205 detects that the power difference is not larger than a predetermined power difference level, the second processing circuit 205 determines that the power amplifying circuit 203 is coupled to the antenna 201 correctly. Then, the second processing circuit 205 stop determines if the power amplifying circuit 203 is coupled to the antenna 201 correctly.

When the second processing circuit 205 detects that the power difference is larger than the predetermined power difference level, the second processing circuit 205 determines that the power amplifying circuit 203 is not coupled to the antenna 201 correctly. In this case, if the power amplifying circuit 203 is not to be used in a normal operation (e.g., the transmitting mode) of the signal transceiving module 200, the second processing circuit 205 further stops the power amplifying circuit 203 from generating the transmitting signal St2. If the power amplifying circuit 203 is to be used in the normal operation of the signal transceiving module 200, the second processing circuit 205 further limits a maximum power of the transmitting signal St2 to a second predetermined power level. It should be noted that, in this embodiment, the signal transceiving module 200 is controlled to double check if the antenna 201 is coupled to the signal port 202 correctly by detecting the received signal Sit and detecting the transmitted signal St2 for more precisely determining the connecting condition of the antenna 201. Then, by controlling the power amplifying circuit 203 to stop generating the transmitting signal St2, or limiting the maximum power of the transmitted signal St2 to the second predetermined power level when the second processing circuit 205 detects that the antenna 201 is not coupled to the signal port 202 correctly, the power amplifying circuit 203 can be prevented from burning out or deterioration.

Figure 3:
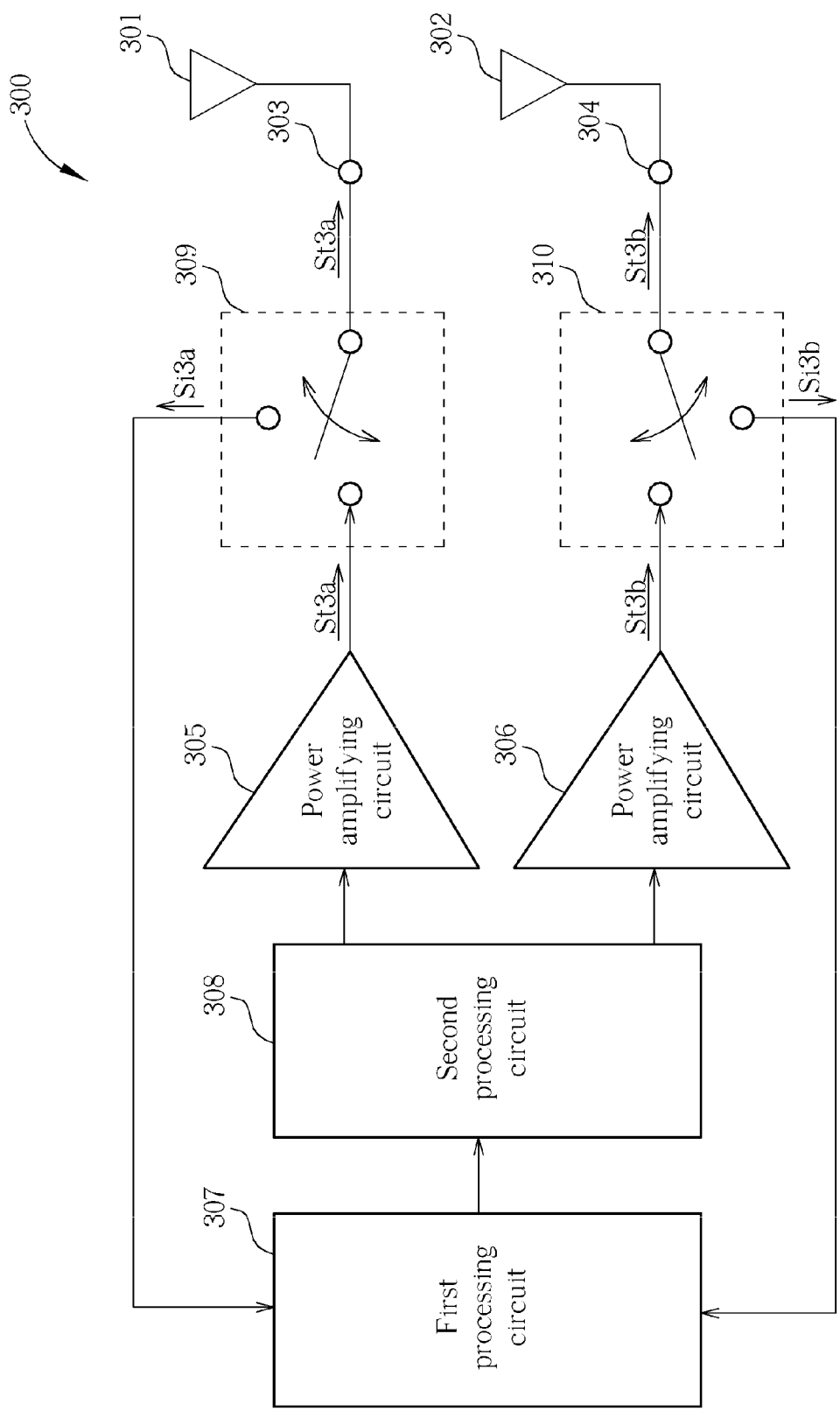
FIG. 3 is a diagram illustrating a signal transceiving module according to a third embodiment of the present invention.

Please refer to FIG. 3. FIG. 3 is a diagram illustrating a signal transceiving module 300 according to a third embodiment of the present invention. The signal transceiving module 300 comprises a first antenna 301, a second antenna 302, a first signal port 303, a second signal port 304, a first power amplifying circuit (PA1) 305, a second power amplifying circuit (PA2) 306, a first processing circuit 307, a second processing circuit 308, a first switching circuit 309, and a second switching circuit 310. The signal transceiving module 300 may be a multi-input-multi-output (MIMO) transceiving system, wherein the multi-input-multi-output transceiving system comprises a plurality of antennas. The first switching circuit 309 is arranged to selectively couple the first signal port 303 to the first processing circuit 307 or the first power amplifying circuit 305. The second switching circuit 310 is arranged to selectively couple the second signal port 304 to the first processing circuit 307 or the second power amplifying circuit 306.

When the signal transceiving module 300 is turned on, the first switching circuit 309 is controlled to couple the first signal port 303 to the first processing circuit 307, and the second switching circuit 310 is controlled to couple the second signal port 304 to the first processing circuit 307. The first processing circuit 307 is arranged to detect a first signal quality of a first received signal Si3a received from the first signal port 303 and detect a second signal quality of a second received signal Si3b received from the second signal port 304 to determine if the first antenna 301 and the second antenna 302 are respectively coupled to the first signal port 303 and the second signal port 304 correctly according to the first and second signal quality. In this embodiment, a parameter PA_overload is defined to determine if a power protection scheme should be operated. More specifically, when the PA_overload is 1, the power protection scheme should be operated, and when the PA_overload is 0, the signal transceiving module 300 can be operated normally.

Figure 4A:
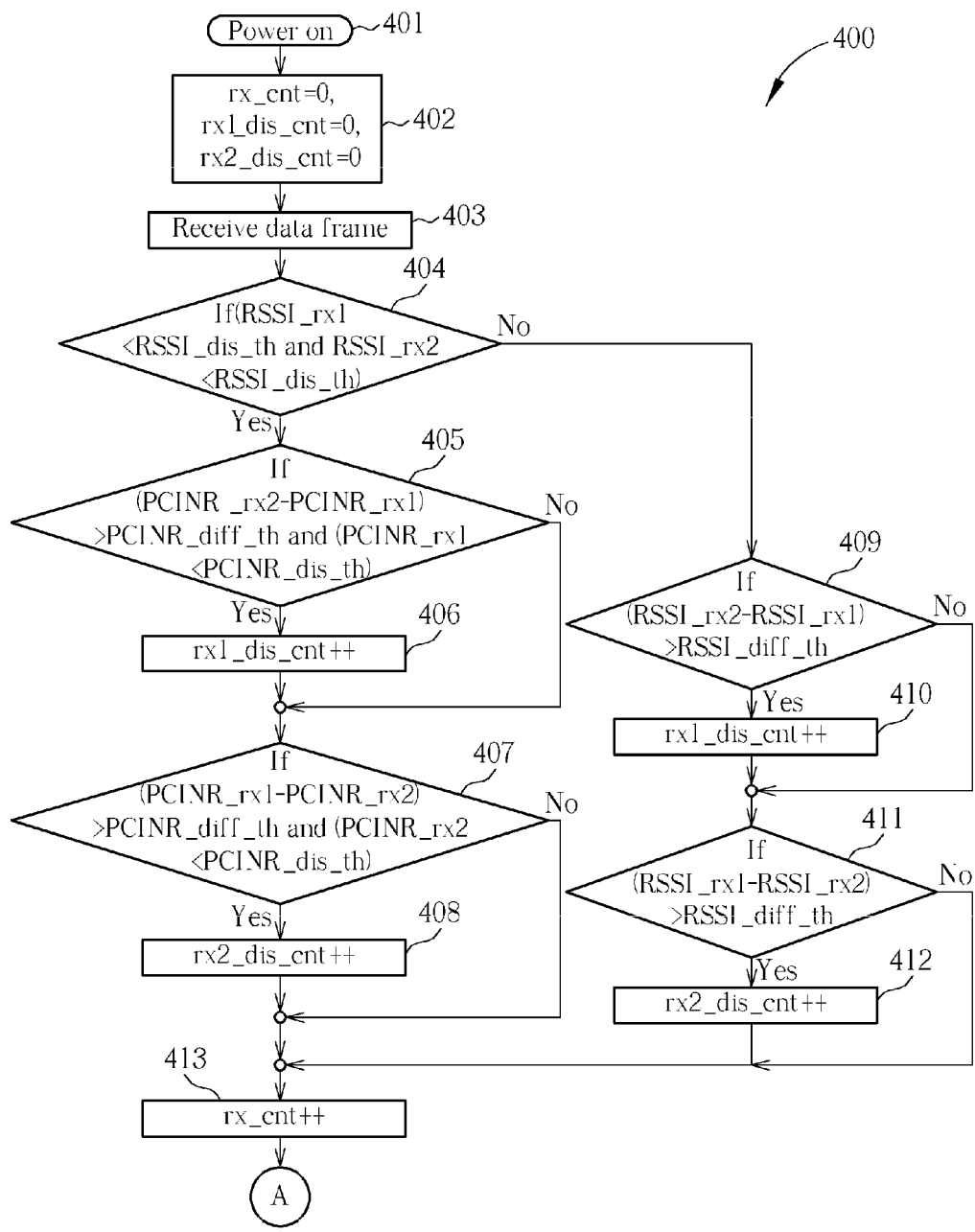
FIG. 4A in conjunction with FIG. 4B is a flowchart illustrating a monitoring method performed by the signal transceiving module of FIG. 3 according to an embodiment of the present invention.
Figure 4B:
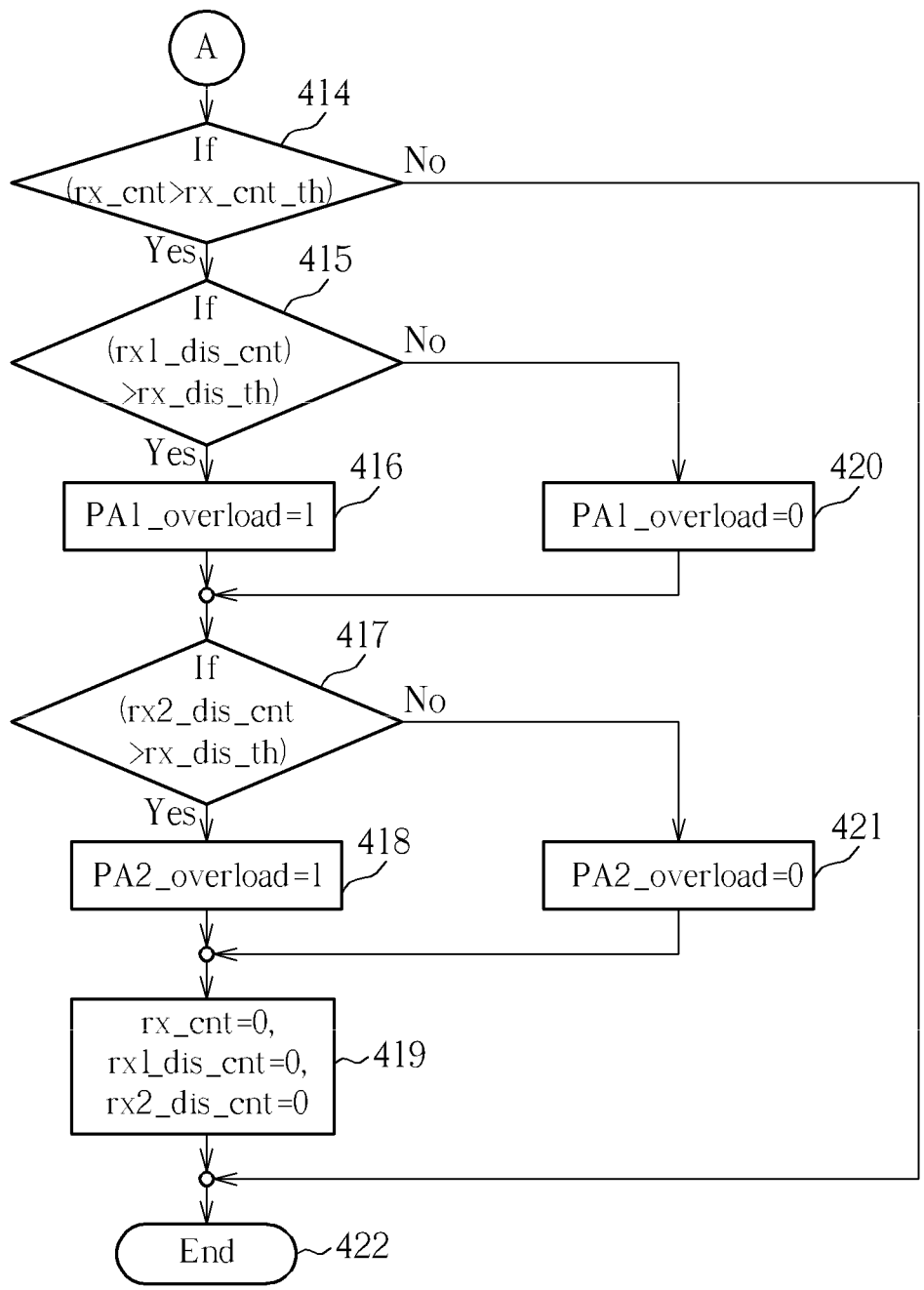

Please refer to FIG. 4A and FIG. 4B. FIG. 4A in conjunction with FIG. 4B is a flowchart illustrating a monitoring method 400 performed by the signal transceiving module 300 according to an embodiment of the present invention. Provided that substantially the same result is achieved, the steps of the flowchart shown in FIG. 4A and FIG. 4B need not be in the exact order shown and need not be contiguous; that is, other steps can be intermediate. The signal transceiving module 300 executes the monitoring method 400 to determine if the first antenna 301 and the second antenna 302 are respectively coupled to the first signal port 303 and the second signal port 304 correctly. The monitoring method 400 comprises the following steps:

Step 401: Power on;

Step 402: Set the initial parameters rx_cnt=0, rx1_dis_cnt=0, and rx2_dis_cnt=0;

Step 403: Receive a data frame via the first antenna 301 and the second antenna 302;

Step 404: Determine if RSSI_rx1<RSSI_dis_th and RSSI_rx2<RSSI_dis_th; if yes, go to step 405, if no go to step 409;

Step 405: Determine if PCINR_rx2−PCINR_rx1>PCINR_diff_th and PCINR_rx1<PCINR_dis_th; if yes, go to step 406, if no, go to step 407;

Step 406: Perform the operation of rx1_dis_cnt++;

Step 407: Determine if PCINR_rx1−PCINR_rx2>PCINR_diff_th and PCINR_rx2<PCINR_dis_th; if yes, go to step 408, if no, go to step 413;

Step 408: Perform the operation of rx2_dis_cnt++, go to step 413;

Step 409: Determine if RSSI_rx2−RSSI_rx1>RSSI_diff_th; if yes, go to step 410, if no go to step 411;

Step 410: Perform the operation of rx1_dis_cnt++;

Step 411: Determine if RSSI_rx1−RSSI_rx2>RSSI_diff_th; if yes, go to step 412, if no go to step 413;

Step 412: Perform the operation of rx2_dis_cnt++;

Step 413: Perform the operation of rx_cnt++;

Step 414: Determine if rx_cnt>rx_cnt_th; if yes, go to step 415, if no, go to step 422;

Step 415: Determine if rx1_dis_cnt>rx_dis_th; if yes, go to step 416, if no, go to step 420;

Step 416: Set the parameter PA1_overoad=1;

Step 417: Determine if rx2_dis_cnt>rx_dis_th; if yes, go to step 418, if no, go to step 421;

Step 418: Set the parameter PA2_overoad=1;

Step 419: Reset the initial parameters rx_cnt=0, rx1_dis_cnt=0, and rx2_dis_cnt=0, go to step 422;

Step 420: Set the parameter PA1_overoad=0, go to step 417;

Step 421: Set the parameter PA2_overoad=0, go to step 419;

Step 422: End the monitoring operation.

When the signal transceiving module 300 is turned on (Step 401), the signal transceiving module 300 sets the initial parameters rx_cnt=0, rx1_dis_cnt=0, and rx2_dis_cnt=0 (Step 402), wherein the parameter rx_cnt represents the counting number of the received downlink sub-frame, the parameter rx1_dis_cnt represents the counting number for determining whether the first antenna 301 is coupled to the first signal port 303 properly, and the parameter rx2_dis_cnt represents the counting number for determining whether the second antenna 302 is coupled to the second signal port 304 properly. Then, the signal transceiving module 300 starts to receive a data frame via the first antenna 301 and the second antenna 302 (Step 403).

When the first processing circuit 307 detects that the first received signal strength indication RSSI_rx1 of the first received signal Si3a and the second received signal strength indication RSSI_rx2 of the second received signal Si3b are both lower than a predetermined quality level RSSI_dis_th (Step 404), the first processing circuit 307 performs a physical carrier to interference-plus-noise ratio (PCINR) checking operation (Step 405-408) upon the first received signal Si3a and the second received signal Si3b to check if the first antenna 301 and the second antenna 302 are respectively coupled to the first signal port 303 and the second signal port 304 correctly. When the first processing circuit 307 detects that at least one of the first received signal strength indication RSSI_rx1 and the second received signal strength indication RSSI_rx2 is not lower than the predetermined quality level RSSI_dis_th, the first processing circuit 307 performs a received signal strength indication (RSSI) checking operation (Step 409-412) upon the first received signal Si3a and the second received signal Si3b to check if the first antenna 301 and the second antenna 302 are respectively coupled to the first signal port 303 and the second signal port 304 correctly.

More specifically, in step 405, when the first processing circuit 307 subtracts the first physical carrier to interference-plus-noise ratio PCINR_rx1 of the first received signal Si3a from the second physical carrier to interference-plus-noise ratio PCINR_rx2 of the second received signal Si3b to check if a difference is larger than a first threshold PCINR_diff_th, and to check if the first physical carrier to interference-plus-noise ratio PCINR_rx1 of the first received signal Si3a is smaller than a second threshold PCINR_dis_th (Step 405); and when the difference is larger than the first threshold PCINR_diff_th and the first physical carrier to interference-plus-noise ratio PCINR_rx1 of the first received signal Si3a is smaller than the second threshold PCINR_dis_th, the first processing circuit 307 determines that the first antenna 301 is not coupled to the first signal port 303 correctly. Then, the first processing circuit 307 increases the counting number of when the first antenna 301 is not coupled to the first signal port 303 correctly by 1, i.e., rx1_dis_cnt++(Step 406). Otherwise, the first processing circuit 307 subtracts the second physical carrier to interference-plus-noise ratio PCINR_rx2 of the second received signal Si3b from the first physical carrier to interference-plus-noise ratio PCINR_rx1 of the first received signal Si3a to check if a difference is larger than the first threshold PCINR_diff_th, and to check if the second physical carrier to interference-plus-noise ratio PCINR_rx2 of the second received signal Si3b is smaller than the second threshold PCINR_dis_th (Step 407). When the difference is larger than the first threshold PCINR_diff_th and the second physical carrier to interference-plus-noise ratio PCINR_rx2 of the second received signal Si3b is smaller than the second threshold PCINR_dis_th, the first processing circuit 307 determines that the second antenna 302 is not coupled to the second signal port 304 correctly. Then, the first processing circuit 307 increases the counting number of when the second antenna 302 is not coupled to the second signal port 304 correctly by 1, i.e., rx2_dis_cnt++(Step 408).

In the received signal strength indication (RSSI) checking operation, the first processing circuit 307 subtracts the first received signal strength indication RSSI_rx1 of the first received signal Si3a from the second received signal strength indication RSSI_rx2 of the second received signal Si3b to check if a difference is larger than a threshold RSSI_diff_th (Step 409); when the difference is larger than the threshold RSSI_diff_th, the first processing circuit 307 determines that the first antenna 301 is not coupled to the first signal port 303 correctly. Then, the first processing circuit 307 increases the counting number of when the first antenna 301 is not coupled to the first signal port 303 correctly by 1, i.e., rx1_dis_cnt++ (Step 410). Otherwise, the first processing circuit 307 subtracts the second received signal strength indication RSSI_rx2 of the second received signal Si3b from the first received signal strength indication RSSI_rx1 of the first received signal Si3a to check if a difference is larger than the threshold RSSI_diff_th (Step 411); and when the difference is larger than the threshold RSSI_diff_th, the first processing circuit 307 determines that the second antenna 302 is not coupled to the second signal port 304 correctly. Then, the first processing circuit 307 increases the counting number of when the second antenna 302 is not coupled to the second signal port 304 correctly by 1, i.e., rx2_dis_cnt++ (Step 412).

In step 413, the first processing circuit 307 increases the counting number of the received downlink sub-frame by 1, i.e., rx_cnt++ (Step 413). When the number rx_cnt of the received downlink sub-frame is greater than a threshold rx_cnt_th (Step 414 in FIG. 4B), the first processing circuit 307 performs the PA overload checking operation (Step 415-419) to check if the first power amplifying circuit 305 and the second power amplifying circuit 306 are possibly overloaded. One possibility is PA could be overloaded due to the antenna is not connected properly. More specifically, the first processing circuit 307 determines if the counting number rx1_dis_cnt of the first antenna 301 is possible not coupled to the first signal port 303 is greater than a threshold rx_dis_th (Step 415). When the counting number rx1_dis_cnt is greater than the threshold rx_dis_th, the first processing circuit 307 determines that the first power amplifying circuit 305 may be overloaded, and sets the parameter PA1_overload as 1 (Step 416). Otherwise, the first processing circuit 307 determines that the first power amplifying circuit 305 is not overloaded, and sets the parameter PA1_overload as 0 (Step 420).

Then, the first processing circuit 307 determines if the counting number rx2_dis_cnt of the second antenna 302 is possibly not coupled to the second signal port 304 is greater than the threshold rx_dis_th (Step 417). When the counting number rx2_dis_cnt is greater than the threshold rx_dis_th, the first processing circuit 307 determines that the second power amplifying circuit 306 may be overloaded, and sets the parameter PA2_overload as 1 (Step 418). Otherwise, the first processing circuit 307 determines that the second power amplifying circuit 306 is not overloaded, and sets the parameter PA2_overload as 0 (Step 421).

When both the overload checking of the first power amplifying circuit 305 and the second power amplifying circuit 306 are checked, the first processing circuit 307 resets the initial parameters rx_cnt, rx1_dis_cnt, and rx2_dis_cnt as 0 (Step 419), and ends the monitoring operation (Step 422).

Figure 5:
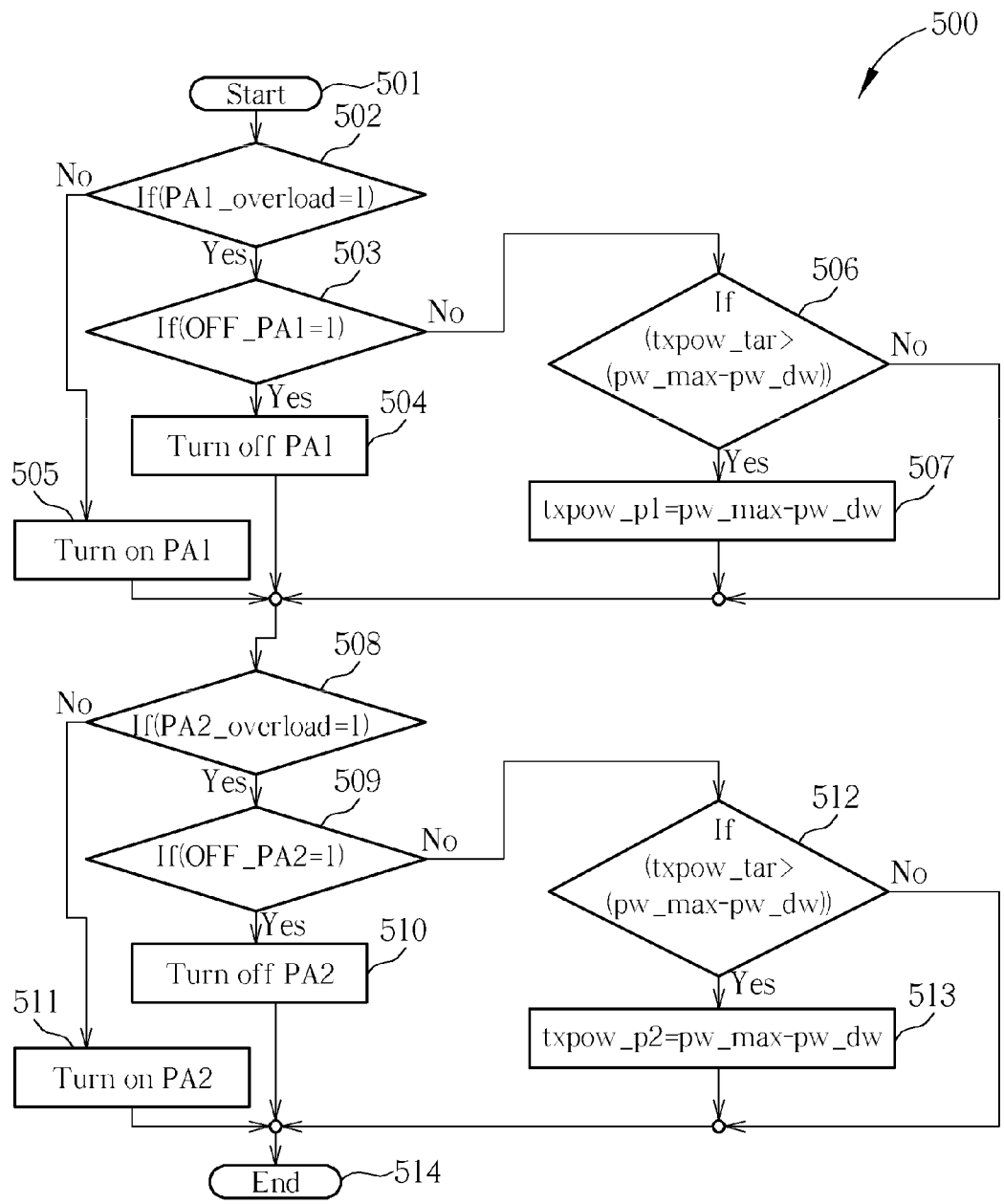
FIG. 5 is a diagram illustrating a power protection scheme performed by the signal transceiving module of FIG. 3 according to an embodiment of the present invention.

In addition, according to the outcome of the overload checking upon the first power amplifying circuit 305 and the second power amplifying circuit 306, the second processing circuit 308 (which may be controlled by the first processing circuit 307) further performs the power protection scheme 500 to control operations of the first power amplifying circuit 305 and the second power amplifying circuit 306 according to the parameters PA1_overload PA2_overload as shown in FIG. 5. FIG. 5 is a diagram illustrating the power protection scheme 500 performed by the signal transceiving module 300 according to an embodiment of the present invention. Provided that substantially the same result is achieved, the steps of the flowchart shown in FIG. 5 need not be in the exact order shown and need not be contiguous, that is, other steps can be intermediate. The power protection scheme 500 comprises the following steps:

Step 501: Start;
Step 502: Determine if the parameter PA1_overload is 1; if yes, go to step 503, if no, go to step 505;
Step 503: Determine if the parameter OFF_PA1 is 1; if yes, go to step 504, if no, go to step 506;
Step 504: Turn off the first power amplifying circuit 305, go to step 508;
Step 505: Turn on the first power amplifying circuit 305, go to step 508;
Step 506: Determine if txpow_tar>pw_max-pw_dw; if yes, go to step 507, if no, go to step 508;
Step 507: Set txpow_p1 as pw_max-pw_dw;
Step 508: Determine if the parameter PA2_overload is 1; if yes, go to step 509, if no, go to step 511;
Step 509: Determine if the parameter OFF_PA2 is 1; if yes, go to step 510, if no, go to step 512;
Step 510: Turn off the second power amplifying circuit 306, go to step 514;
Step 511: Turn on the second power amplifying circuit 306, go to step 514;
Step 512: Determine if txpow_tar>(pw_max-pw_dw); if yes, go to step 513, if no, go to step 514;
Step 513: Set txpow_p2 as pw_max-pw_dw;
Step 514: End the power protection scheme 500.

When the PA overload checking operation (Step 415-419) is performed, the second processing circuit 308 (which may be controlled by the first processing circuit 307) checks the outcome of the parameter PA1_overload to determine if the first power amplifying circuit 305 is overloaded (Step 502). When the first power amplifying circuit 305 is overloaded, and when the first power amplifying circuit 305 is not to be used in the normal operation of the signal transceiving module 300, i.e., when OFF_PA1=1, the second processing circuit 308 stops the first power amplifying circuit 305 from generating the transmitting signal St3a. For example, the second processing circuit 308 just turns off the first power amplifying circuit 305 (Step 504). However, when the first power amplifying circuit 305 is overloaded, and when the first power amplifying circuit 305 is to be used in the normal operation of the signal transceiving module 300, the second processing circuit 308 determines if the power txpow_tar to be transmitted by the first power amplifying circuit 305 is larger than the predetermined power level, wherein the predetermined power level is a power level lower than the maximum power pw_max of the first power amplifying circuit 305 by a predetermined power range pw_dw, i.e., pw_max-pw_dw. When the second processing circuit 308 determines that the power txpow_tar to be transmitted by the first power amplifying circuit 305 is larger than the predetermined power level, i.e., txpow_tar>pw_max−pw_dw, the second processing circuit 308 sets the maximum power txpow_p1 to be transmitted by the first power amplifying circuit 305 as the predetermined power level, i.e., pw_max−pw_dw.

In addition, the second processing circuit 308 checks the outcome of the parameter PA2_overload to determine if the second power amplifying circuit 306 is overloaded (Step 508). When the second power amplifying circuit 306 is overloaded, and when the second power amplifying circuit 306 is not to be used in the normal operation of the signal transceiving module 300, i.e., when OFF_PA2=1, the second processing circuit 308 stops the second power amplifying circuit 306 from generating the transmitting signal St3b. For example, the second processing circuit 308 just turns off the second power amplifying circuit 306 (Step 510). However, when the second power amplifying circuit 306 is overloaded, and when the second power amplifying circuit 306 is to be used in the normal operation of the signal transceiving module 300, the second processing circuit 308 determines if the power txpow_tar to be transmitted by the second power amplifying circuit 306 is larger than the predetermined power level, wherein the predetermined power level is a power level lower than the maximum power pw_max of the second power amplifying circuit 306 by a predetermined power range pw_dw, i.e., pw_max−pw_dw. When the second processing circuit 308 determines that the power txpow_tar to be transmitted by the second power amplifying circuit 306 is larger than the predetermined power level, i.e., txpow_tar>pw_max−pw_dw, the second processing circuit 308 sets the maximum power txpow_p2 to be transmitted by the second power amplifying circuit 306 as the predetermined power level, i.e., pw_max−pw_dw.

In steps 502 and 508, when the first power amplifying circuit 305 and the second power amplifying circuit 306 are not overloaded, the second processing circuit 308 simply turns on the first power amplifying circuit 305 and the second power amplifying circuit 306 (steps 505 and 511).

Therefore, by controlling the power amplifying circuit having an antenna that is not coupled to its signal port correctly to stop generating the transmitting signal, or by limiting the maximum power of the transmitted signal to the predetermined power level, the power amplifying circuit can be prevented from burning out or deterioration.

Figure 6:
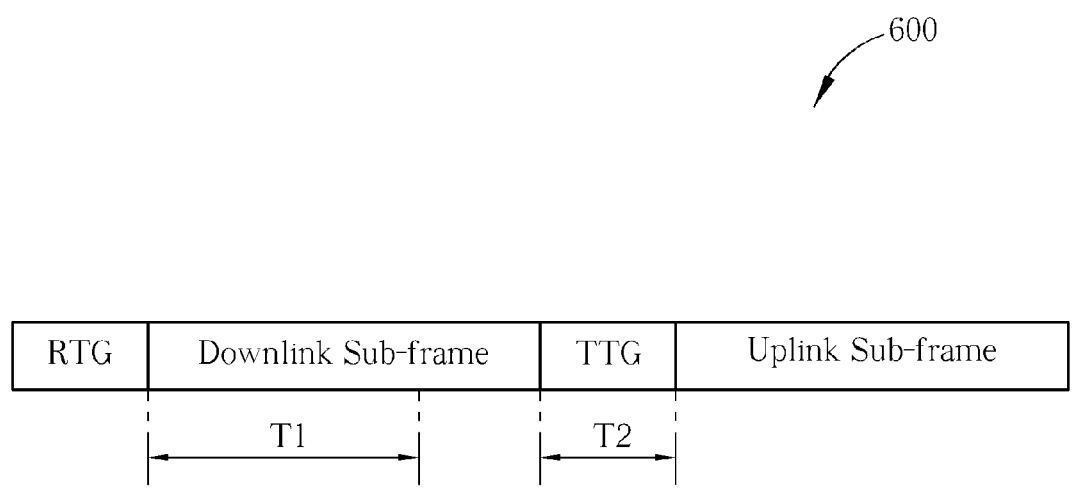
FIG. 6 is a timing diagram illustrating a data frame received and transmitted by the signal transceiving module of FIG. 3 according to an embodiment of the present invention.

Please refer to FIG. 6. FIG. 6 is a timing diagram illustrating a data frame 600 received and transmitted by the signal transceiving module 300 according to an embodiment of the present invention. The data frame 600 comprises a receive transition gap (RTG), a downlink (DL) sub-frame, a transmit transition gap (TTG), and an uplink (UL) sub-frame. According to the embodiment, the monitoring operation (i.e., the monitoring method 400) is performed in a time interval T1 when the downlink sub-frame is received. Based on the outcome of the monitoring operation, the power protection scheme 500 is performed before the transmission of the uplink sub-frame, i.e., in a time interval T2 of the transmit transition gap.

Figure 7:
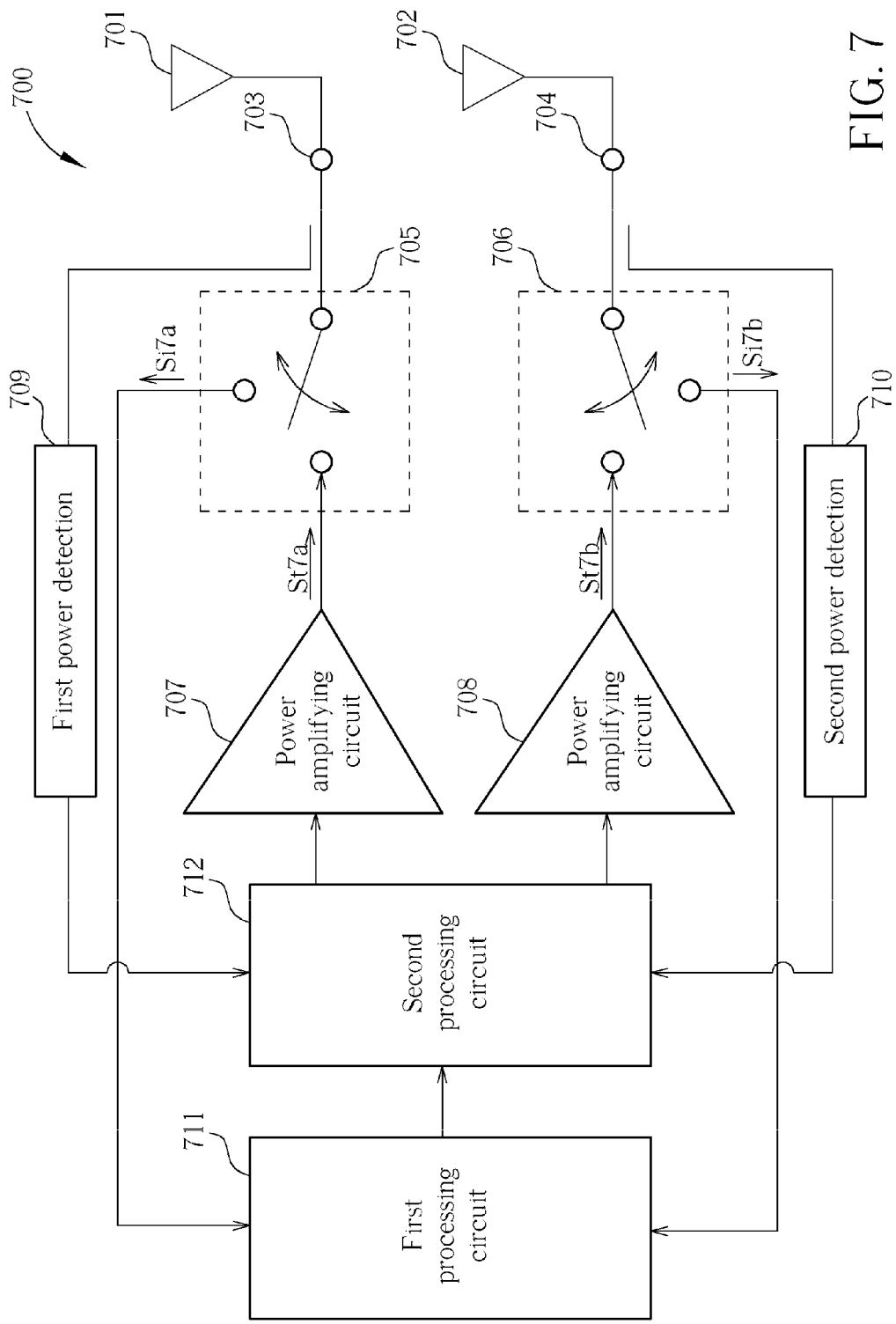
FIG. 7 is a diagram illustrating a signal transceiving module according to a fourth embodiment of the present invention.

Please refer to FIG. 7. FIG. 7 is a diagram illustrating a signal transceiving module 700 according to a fourth embodiment of the present invention. The signal transceiving module 700 comprises a first antenna 701, a second antenna 702, a first signal port 703, a second signal port 704, a first switching circuit 705, and a second switching circuit 706, a first power amplifying circuit 707, a second power amplifying circuit 708, a first power detector 709, a second power detector 710, a first processing circuit 711, and a second processing circuit 712. The signal transceiving module 700 may be a multi-input-multi-output (MIMO) transceiving system, wherein the multi-input-multi-output transceiving system comprises a plurality of antennas. The first switching circuit 705 is arranged to selectively couple the first signal port 703 to the first processing circuit 711 or the first power amplifying circuit 707. The second switching circuit 706 is arranged to selectively couple the second signal port 704 to the first processing circuit 711 or the second power amplifying circuit 708. The first processing circuit 711 determines if the first antenna 701 and the second antenna 702 are respectively coupled to the first signal port 703 and the second signal port 704 correctly according to the first received signal Si7a and the second received signal Si7b as described in the above-mentioned embodiment (i.e., the signal transceiving module 300), and when the first processing circuit 711 determines that one antenna is not coupled to its signal port correctly, the corresponding switching circuit couples the signal port to the corresponding power amplifying circuit. Then, the second processing circuit 712 (e.g., a transmitter), which is coupled to the first power amplifying circuit 707 and the second power amplifying circuit 708, is arranged to control the first power amplifying circuit 707 to output the first transmitting signal St7a having a first predetermined power level to the first signal port 703 when the first power amplifying circuit 707 is coupled to the first signal port 703, and to control the second power amplifying circuit 708 to output the second transmitting signal St7b having a second predetermined power level to the second signal port 704 when the second power amplifying circuit 708 is coupled to the second signal port 704.

The first power detector 709, which is coupled to the second processing circuit 712 and the first signal port 703, is arranged to detect a power level at the first signal port 703 when the first power amplifying circuit 707 outputs the first transmitting signal St7a. The second power detector 710, which is coupled to the second processing circuit 712 and the second signal port 704, is arranged to detect a power level at the second signal port 704 when the second power amplifying circuit 708 outputs the second transmitting signal St7b. Then, the second processing circuit 712 further determines if the first power amplifying circuit 707 is coupled to the first antenna 701 correctly according to a power difference between the power level of the first transmitting signal St7a and a predetermined power level, and determines if the second power amplifying circuit 708 is coupled to the second antenna 702 correctly according to a power difference between the power level of the second transmitting signal St7b and the predetermined power level.

More specifically, when the signal transceiving module 700 is turned on, the first switching circuit 705 is controlled to couple the first signal port 703 to the first processing circuit 711, and the second switching circuit 706 is controlled to couple the second signal port 704 to the first processing circuit 711. The first processing circuit 711 is arranged to detect a first signal quality of a first received signal Si7a received from the first signal port 703 and detect a second signal quality of a second received signal Si7b received from the second signal port 704 to determine if the first antenna 701 and the second antenna 702 are respectively coupled to the first signal port 703 and the second signal port 704 correctly according to the first signal quality and the second signal quality. Similar to the above embodiment (i.e., the signal transceiving module 300), a parameter PA_overload is also defined to determine if a power protection scheme should be operated. More specifically, when the PA_overload is 1, the power protection scheme should be operated, and when the PA_overload is 0, the signal transceiving module 700 can be operated normally.

Figure 8A:
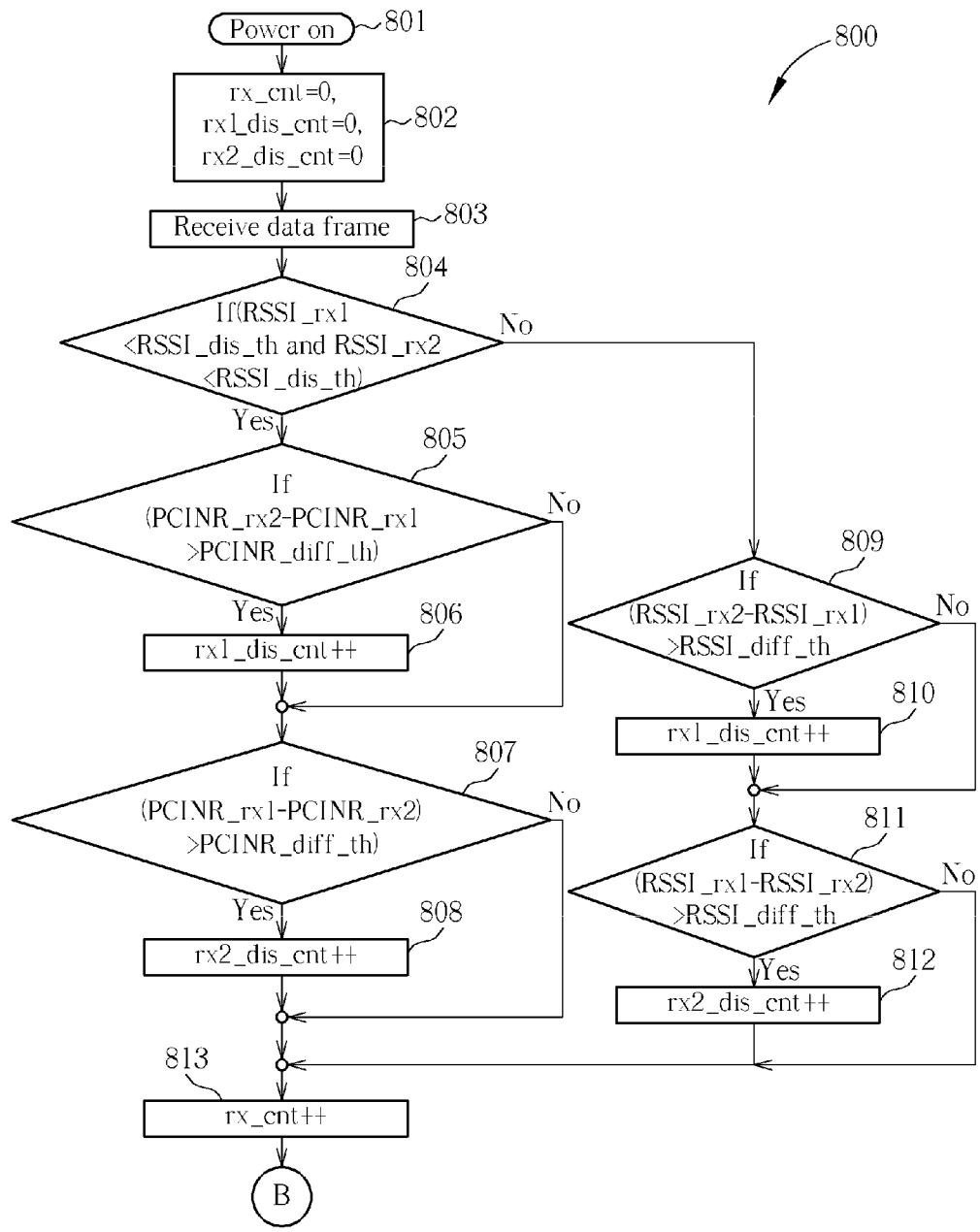
FIG. 8A in conjunction with FIG. 8B is a flowchart illustrating a monitoring method performed by the signal transceiving module of FIG. 7 according to an embodiment of the present invention.
Figure 8B:
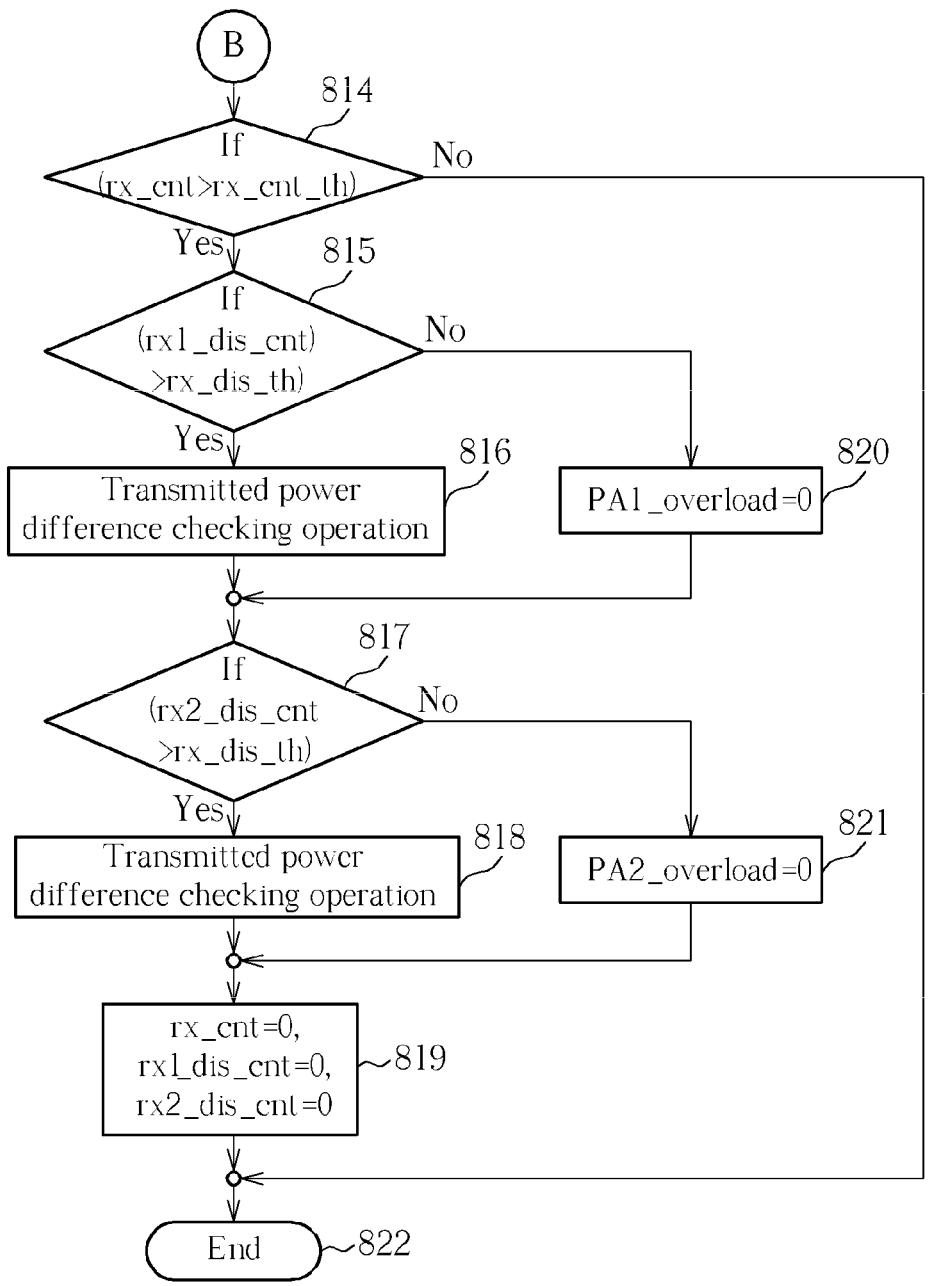

Please refer to FIG. 8A and FIG. 8B. FIG. 8A in conjunction with FIG. 8B is a flowchart illustrating a monitoring method 800 performed by the signal transceiving module 700 according to an embodiment of the present invention. Provided that substantially the same result is achieved, the steps of the flowchart shown in FIG. 8A and FIG. 8B need not be in the exact order shown and need not be contiguous; that is, other steps can be intermediate. The signal transceiving module 700 executes the monitoring method 800 to determine if the first antenna 701 and the second antenna 702 are respectively coupled to the first signal port 703 and the second signal port 704 correctly. The monitoring method 800 comprises the following steps:

Step 801: Power on;

Step 802: Set the initial parameters rx_cnt=0, rx1_dis_cnt=0, and rx2_dis_cnt=0;

Step 803: Receive a data frame via the first antenna 701 and the second antenna 702;

Step 804: Determine if RSSI_rx1<RSSI_dis_th and RSSI_rx2<RSSI_dis_th; if yes, go to step 805, if no go to step 809;

Step 805: Determine if PCINR_rx2−PCINR_rx1>PCINR_diff_th; if yes, go to step 806, if no, go to step 807;

Step 806: Perform the operation of rx1_dis_cnt++;

Step 807: Determine if PCINR_rx1−PCINR_rx2>PCINR_diff_th; if yes, go to step 808, if no, go to step 813;

Step 808: Perform the operation of rx2_dis_cnt++, go to step 813;

Step 809: Determine if RSSI_rx2−RSSI_rx1>RSSI_diff_th; if yes, go to step 810, if no go to step 811;

Step 810: Perform the operation of rx1_dis_cnt++;

Step 811: Determine if RSSI_rx1−RSSI_rx2>RSSI_diff_th; if yes, go to step 812, if no go to step 813;

Step 813: Perform the operation of rx2_cnt++;

Step 814: Determine if rx_cnt>rx_cnt_th; if yes, go to step 815, if no, go to step 822;

Step 815: Determine if rx_dis_cnt>rx_dis_th if yes, go to step 816, if no go to step 820;

Step 816: Perform the transmitted power difference checking operation;

Step 817: Determine if rx2_dis_cnt>rx_dis_th; if yes, go to step 818, if no, go to step 821;

Step 818: Perform the transmitted power difference checking operation;

Step 819: Reset the initial parameters rx_cnt=0, rx1_dis_cnt=0, and rx2_dis_cnt=0, go to step 822;

Step 820: Set the parameter PA1_overoad=0, go to step 817;

Step 821: Set the parameter PA2_overoad=0, go to step 819;

Step 822: End the monitoring operation.

It should be noted that, as the operation of the monitoring method 800 is similar to the operation of the monitoring method 400, the detailed description of the steps 801-822 is omitted here for brevity. According to this embodiment, in step 814 in FIG. 8B, when the number rx_cnt of the received downlink sub-frame is greater than a threshold rx_cnt_th, the first processing circuit 711 performs the PA overload checking operation (Step 815-819) to check if the first power amplifying circuit 707 and the second power amplifying circuit 708 are overloaded. More specifically, the first processing circuit 711 determines if the counting number rx1_dis_cnt of when the first antenna 701 is not coupled to the first signal port 703 is greater than a threshold rx_dis_th (Step 815). When the counting number rx1_dis_cnt is not greater than the threshold rx_dis_th, the first processing circuit 711 determines that the first power amplifying circuit 707 is not overloaded, and sets the parameter PA1_overload as 0 (Step 820). Otherwise, the first processing circuit 711 performs the transmitted power difference checking operation to further determine if the first power amplifying circuit 707 is overloaded or not as shown in FIG. 8B (step 816). Similarly, the first processing circuit 711 further determines if the counting number rx2_dis_cnt of when the second antenna 702 is not coupled to the second signal port 704 is greater than a threshold rx_dis_th (Step 817). When the counting number rx2_dis_cnt is greater than the threshold rx_dis_th, the first processing circuit 711 determines that the second power amplifying circuit 708 is not overloaded, and sets the parameter PA2_overload as 0 (Step 821). Otherwise, the first processing circuit 711 performs the transmitted power difference checking operation to further determine if the second power amplifying circuit 708 is overloaded or not as shown in FIG. 8B (Step 818).

Figure 9:
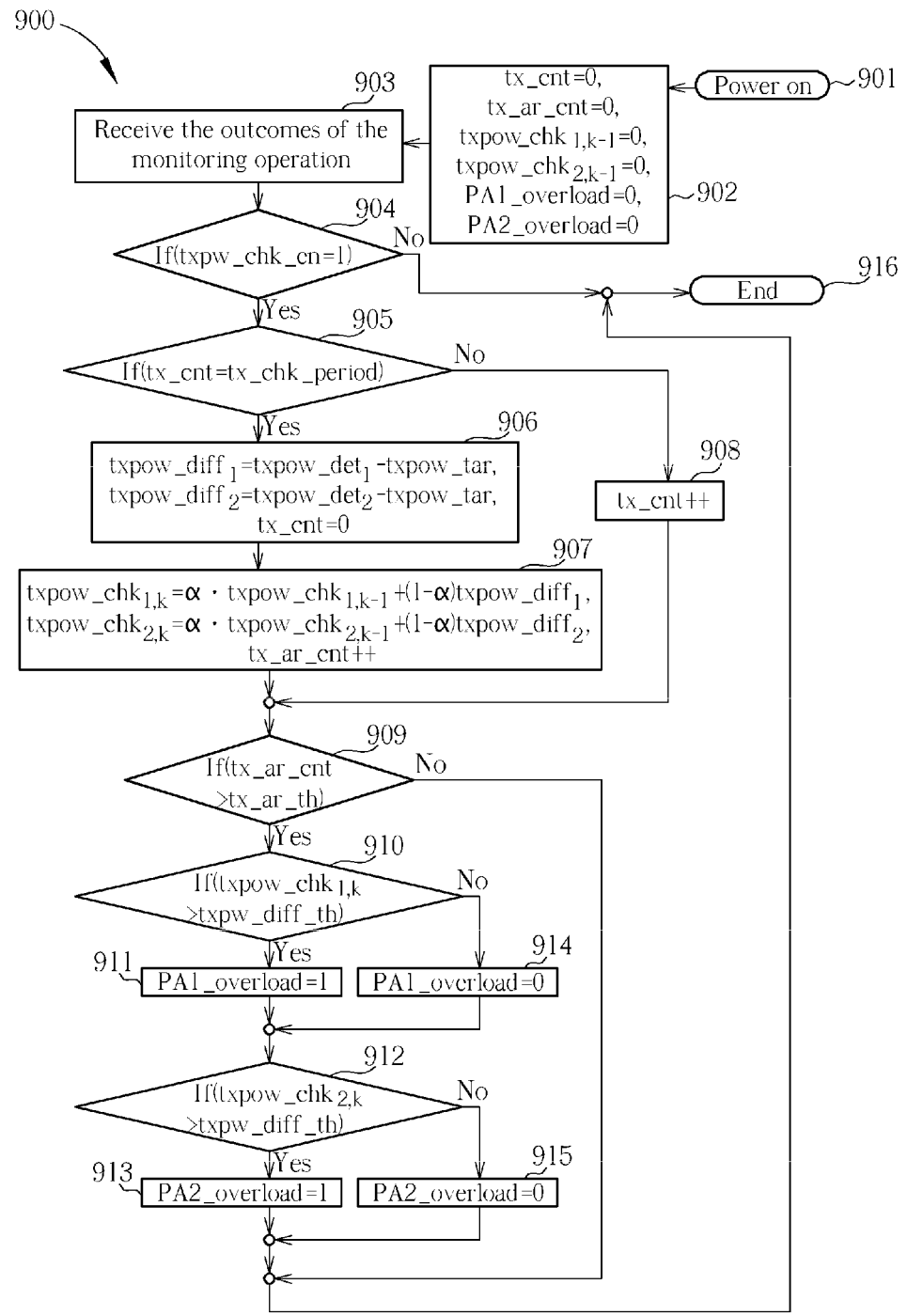
FIG. 9 is a flowchart illustrating a transmitted power difference checking method performed by the signal transceiving module of FIG. 7 according to an embodiment of the present invention.

FIG. 9 is a flowchart illustrating a transmitted power difference checking method 900 performed by the signal transceiving module 700 according to an embodiment of the present invention. Provided that substantially the same result is achieved, the steps of the flowchart shown in FIG. 9 need not be in the exact order shown and need not be contiguous; that is, other steps can be intermediate. The signal transceiving module 700 performs the transmitted power difference checking method 900 to further determine if the first antenna 701 and the second antenna 702 are respectively coupled to the first signal port 703 and the second signal port 704 correctly. The transmitted power difference checking method 900 comprises the following steps:

Step 901: Power on;

Step 902: Set the initial parameters tx_cnt=0, tx_ar_cnt=0, txpow_chk$_{1,k-1}$=0, txpow_chk$_{2,k-1}$=0, PA1_overload=0, and PA2_overload=0;

Step 903: Receive the outcomes of the monitoring method 800;

Step 904: Determine if the txpw_chk_en is 1; if yes, go to step 905, if no, go to step 916;

Step 905: Determine if tx_cnt is tx_chk_period; if yes, go to step 906, if no, go to step 908;

Step 906: Determine txpow_diff$_1$ by txpow_det$_1$-txpow_tar, and/or determine txpow_diff$_2$ by txpow_det$_2$-txpow_tar, and set tx_cnt as 0;

Step 907: Determine txpow_chk$_{1,k}$ by α·txpow_chk$_{1,k-1}$+(1−α)txpow_diff$_1$, and/or determine txpow_chk$_{2,k}$ by α·txpow_chk$_{2,k-1}$+(1−α)txpow_diff$_2$, and perform the operation of tx_ar_cnt++, go to step 909;

Step 908: Perform the operation of tx_cnt++;

Step 909: Determine if tx_ar_cnt>tx_ar_th; if yes, go to step 910, if no, go to step 916;

Step 910: Determine if txpow_chk$_{1,k}$>txpw_diff_th; if yes, go to step 911, if no go to step 914;

Step 911: Set the parameter PA1_overoad=1, and go to step 912;

Step 912: Determine if txpow_chk$_{2,k}$>txpw_diff_th; if yes, go to step 913, if no go to step 915;

Step 913: Set the parameter PA2_overoad=1, go to step 916;

Step 914: Set the parameter PA1_overoad=0, and go to step 912;

Step 915: Set the parameter PA2_overoad=0, go to step 916;

Step 916: End the transmitted power difference checking operation.

When the first power amplifying circuit 707 and the second power amplifying circuit 708 of the signal transceiving module 700 are turned on (Step 901), the signal transceiving module 700 sets the initial parameters tx_cnt=0, tx_ar_cnt=0, txpow_chk$_{1,k-1}$=0, txpow_chk$_{2,k-1}$=0, PA1_overload=0, and PA2_overload=0 (Step 902), wherein the parameter tx_cnt represents if the signal transceiving module 700 enters the period of using the first power amplifying circuit 707 and/or the second power amplifying circuit 708 to transmit the first transmitting signal St7a and/or the second transmitting signal St7b, the parameter tx_ar_cnt represents the counting number of the transmitted uplink sub-frame of the data frame, the parameter txpow_chk$_{1,k-1}$ represents the average transmitted power difference of the first power amplifying circuit 707 in transmitting k times of the uplink sub-frame, the parameter txpow_chk$_{2,k-1}$ represents the average transmitted power difference of the second power amplifying circuit 708 in transmitting k times of the uplink sub-frame, the parameter PA1_overload represents if the first power amplifying circuit 707 is overloaded, and the parameter PA2_overload represents if the second power amplifying circuit 708 is overloaded.

When the outcomes of the monitoring method 800 show that the transmitted power difference checking operation of the first power amplifying circuit 707 should be performed (i.e., the step 816) and/or the transmitted power difference checking operation of the second power amplifying circuit 708 should be performed (i.e., the step 818), the first switching circuit 705 is controlled to couple the first signal port 703 to the first power amplifying circuit 707, and/or the second switching circuit 706 is controlled to couple the second signal port 704 to the second power amplifying circuit 708 (i.e., txpw_chk_en=1 in step 904). Then, the signal transceiving module 700 enters the average transmitted power difference detection (step 905-907). For brevity, the following description focuses on when both of the transmitted power difference checking operations of the first power amplifying circuit 707 and the second power amplifying circuit 708 should be performed.

In step 905, when the signal transceiving module 700 enters the period tx_chk_period of using the first power amplifying circuit 707 and the second power amplifying circuit 708 to transmit the first transmitting signal St7a and the second transmitting signal St7b respectively (i.e., when tx_cnt=tx_chk_period), the second processing circuit 712 controls the first power amplifying circuit 707 and the second power amplifying circuit 708 to transmit the first transmitting signal St7a having a predetermined power txpow_tar and the second transmitting signal St7b having the predetermined power txpow_tar.

Then, in step 906, the first power detector 709 detects the first detected power txpow_det$_1$ corresponding to the first transmitting signal St7a, and the second power detector 710 detects the second detected power txpow_det$_2$ corresponding to the second transmitting signal St7b. The second processing circuit 712 further determines the first transmitted power difference txpow_diff$_1$ between the first detected power txpow_det$_1$ and the predetermined power txpow_tar (i.e., txpow_det$_1$-txpow_tar), and determines the second transmitted power difference txpow_diff$_2$ between the second detected power txpow_det$_2$ and the predetermined power txpow_tar (i.e., txpow_det$_2$-txpow_tar). In some exemplary embodiments, Txpow_det may be calibrated to add some compensation so that twpow_det should be very close to txpow_tar when antenna is properly connected. In some exemplary embodiments, txpow_det is taken an absolute value for comparison before performing the autoregression to compute txpow_chk.

In step 907, after using the first power amplifying circuit 707 and the second power amplifying circuit 708 to transmit the first transmitting signal St7a and the second transmitting signal St7b respectively for outputting a plurality of the uplink sub-frames, the second processing circuit 712 determines the average transmitted power difference txpow_chk$_{1,k-1}$ of the first power amplifying circuit 707 and the average transmitted power difference txpow_chk$_{2,k-1}$ of the second power amplifying circuit 708 according to the equations of $\alpha \cdot$txpow_chk$_{1,k-1}$+(1-$\alpha$)txpow_diff$_1$ and $\alpha \cdot$txpow_chk$_{2,k-1}$+(1-$\alpha$)txpow_diff$_2$ respectively, wherein 0<$\alpha$<1.

When the number tx_ar_cnt of the transmitted uplink sub-frames transmitted by the first power amplifying circuit 707 and the second power amplifying circuit 708 is larger than a threshold number tx_ar_th (i.e., tx_ar_cnt>tx_ar_th in step 909), the signal transceiving module 700 enters the PA overload checking operation (Step 910-915). Then, the second processing circuit 712 determines if the average transmitted power difference txpow_chk$_{1,k-1}$ of the first power amplifying circuit 707 is larger than a threshold power difference txpw_diff_th (step 910). If the second processing circuit 712 determines that the average transmitted power difference txpow_chk$_{1,k-1}$ is larger than the threshold power difference txpw_diff_th, the second processing circuit 712 determines that the first power amplifying circuit 707 is overloaded (PA1_overload=1 in step 911). Otherwise, the second processing circuit 712 determines that the first power amplifying circuit 707 is not overloaded (PA1_overload=0 in step 914).

The second processing circuit 712 further determines if the average transmitted power difference txpow_chk$_{2,k-1}$ of the second power amplifying circuit 708 is larger than the threshold power difference txpw_diff_th (step 912). If the second processing circuit 712 determines that the average transmitted power difference txpow_chk$_{2,k-1}$ is larger than the threshold power difference txpw_diff_th, the second processing circuit 712 determines that the second power amplifying circuit 708 is overloaded (PA2_overload=1 in step 913). Otherwise, the second processing circuit 712 determines that the second power amplifying circuit 708 is not overloaded (PA2_overload=0 in step 915). The transmitted power difference checking operation of the signal transceiving module 700 is ended (step 916) when both of the overload conditions of the first power amplifying circuit 707 and the second power amplifying circuit 708 are determined.

Figure 10:
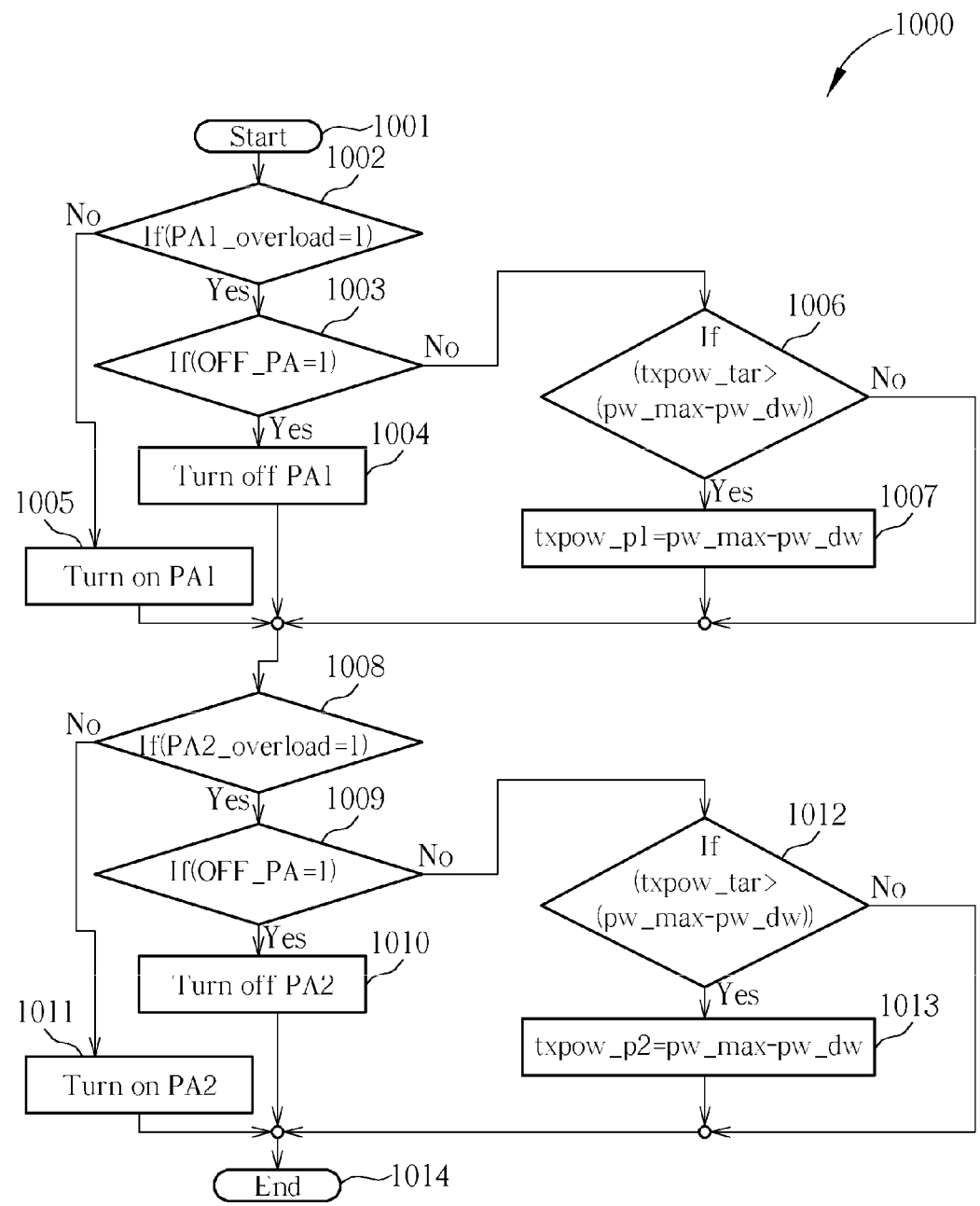
FIG. 10 is a diagram illustrating a power protection scheme performed by the signal transceiving module of FIG. 7 according to an embodiment of the present invention.

In addition, according to the outcome of the overload checking upon the first power amplifying circuit 707 and the second power amplifying circuit 708, the second processing circuit 712 further performs the power protection scheme 1000 to control operations of the first power amplifying circuit 707 and the second power amplifying circuit 708 according to the parameters PA1_overload PA2_overload as shown in FIG. 10. FIG. 10 is a diagram illustrating the power protection scheme 1000 performed by the signal transceiving module 700 according to an embodiment of the present invention. Provided that substantially the same result is achieved, the steps of the flowchart shown in FIG. 10 need not be in the exact order shown and need not be contiguous; that is, other steps can be intermediate. The power protection scheme 1000 comprises the following steps:

Step 1001: Start;

Step 1002: Determine if the parameter PA1_overload is 1; if yes, go to step 1003, if no, go to step 1005;

Step 1003: Determine if the parameter OFF_PA1 is 1; if yes, go to step 1004, if no, go to step 1006;

Step 1004: Turn off the first power amplifying circuit 707, go to step 1008;

Step 1005: Turn on the first power amplifying circuit 707, go to step 1008;

Step 1006: Determine if txpow_tar>pw_max−pw_dw; if yes, go to step 1007, if no, go to step 1008;

Step 1007: Set txpow_p1 as pw_max−pw_dw;

Step 1008: Determine if the parameter PA2_overload is 1; if yes, go to step 1009, if no, go to step 1011;

Step 1009: Determine if the parameter OFF_PA2 is 1; if yes, go to step 1010, if no, go to step 1012;

Step 1010: Turn off the second power amplifying circuit 708, go to step 1014;

Step 1011: Turn on the second power amplifying circuit 708, go to step 1014;

Step 1012: Determine if txpow_tar>(pw_max−pw_dw); if yes, go to step 1013, if no, go to step 1014;

Step 1013: Set txpow_p2 as pw_max−pw_dw;

Step 1014: End the power protection scheme 1000.

When the PA overload checking operation (Step 910-915) is performed, the second processing circuit 712 (which may be controlled by the first processing circuit 711) checks the outcome of the parameter PA1_overload to determines if the first power amplifying circuit 707 is overloaded (Step 1002). When the first power amplifying circuit 707 is overloaded, and when the first power amplifying circuit 707 is not to be used in the normal operation of the signal transceiving module 700, i.e., when OFF_PA1=1, the second processing circuit 712 stops the first power amplifying circuit 707 from generating the transmitting signal St7a. For example, the second processing circuit 712 just turns off the first power amplifying circuit 707 (Step 1004). However, when the first power amplifying circuit 707 is overloaded, and when the first power amplifying circuit 707 is to be used in the normal operation of the signal transceiving module 700, the second processing circuit 712 determines if the power txpow_tar to be transmitted by the first power amplifying circuit 707 is larger than the predetermined power level, wherein the predetermined power level is a power level lower than the maximum power pw_max of the first power amplifying circuit 707 by a predetermined power range pw_dw, i.e., pw_max−pw_dw. When the second processing circuit 712 determines that the power txpow_tar to be transmitted by the first power amplifying circuit 707 is larger than the predetermined power level, i.e., txpow_tar>pw_max−pw_dw, the second processing circuit 712 sets the maximum power txpow_p1 to be transmitted by the first power amplifying circuit 707 as the predetermined power level, i.e., pw_max−pw_dw.

In addition, the second processing circuit 712 checks the outcome of the parameter PA2_overload to determine if the second power amplifying circuit 708 is overloaded (Step 1008). When the second power amplifying circuit 708 is overloaded, and when the second power amplifying circuit 708 is not to be used in the normal operation of the signal transceiving module 700, i.e., when OFF_PA2=1, the second processing circuit 712 stops the second power amplifying circuit 708 from generating the transmitting signal St7b. For example, the second processing circuit 712 just turns off the second power amplifying circuit 708 (Step 1010). However, when the second power amplifying circuit 708 is overloaded, and when the second power amplifying circuit 708 is to be used in the normal operation of the signal transceiving module 700, the second processing circuit 712 determines if the power txpow_tar to be transmitted by the second power amplifying circuit 708 is larger than the predetermined power level, wherein the predetermined power level is a power level lower than the maximum power pw_max of the second power amplifying circuit 708 by a predetermined power range pw_dw, i.e., pw_max−pw_dw. When the second processing circuit 712 determines that the power txpow_tar to be transmitted by the second power amplifying circuit 708 is larger than the predetermined power level, i.e., txpow_tar>pw_max−pw_dw, the second processing circuit 712 sets the maximum power txpow_p2 to be transmitted by the second power amplifying circuit 708 as the predetermined power level, i.e., pw_max−pw_dw. The advantage of OFF_PA=1 is the operation mode which turn-off the PA, and it not only protect the PA, but also save some transmission power. The advantage of OFF_PA=0, it just transmits less power to protect the PA from overloading. Thus, the mode of OFF_PA=0 could have better transmission performance with the cost of more PA power compared with OFF_PA=1 mode.

In steps 1002 and 1008, when the first power amplifying circuit 707 and the second power amplifying circuit 708 are not overloaded, the second processing circuit 712 simply turns on the first power amplifying circuit 707 and the second power amplifying circuit 708 (steps 1005 and 1011).

Therefore, by controlling the power amplifying circuit having an antenna that is not coupled to its signal port correctly to stop generate the transmitting signal, or limiting the maximum power of the transmitted signal to the predetermined power level, the power amplifying circuit can be prevented from burning out or deterioration.

Figure 11:
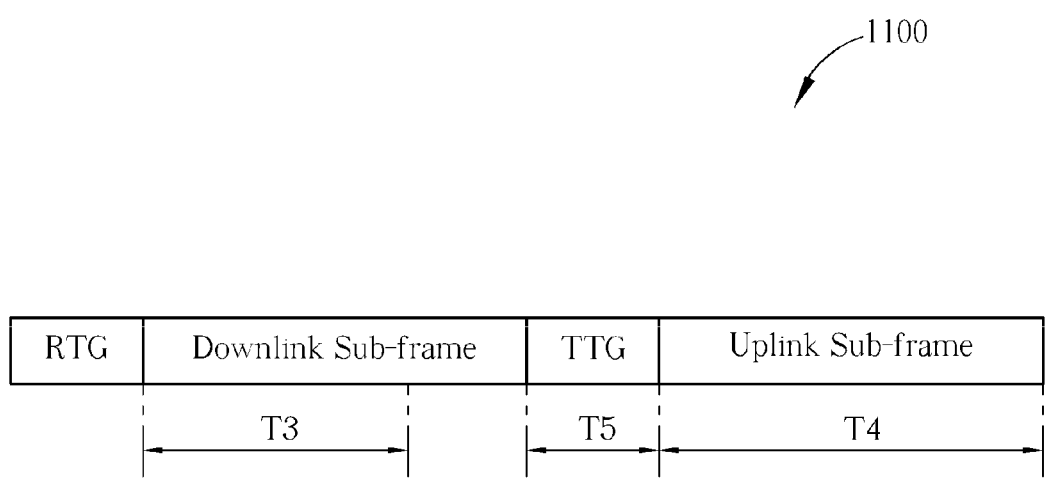
FIG. 11 is a timing diagram illustrating a data frame received and transmitted by the signal transceiving module of FIG. 7 according to an embodiment of the present invention.

Please refer to FIG. 11. FIG. 11 is a timing diagram illustrating a data frame 1100 received and transmitted by the signal transceiving module 700 according to an embodiment of the present invention. The data frame 1100 comprises a receive transition gap (RTG), a downlink (DL) sub-frame, a transmit transition gap (TTG), a uplink (UL) sub-frame. According to the embodiment, the monitoring operation (i.e., the monitoring method 800) is performed in a time interval T3 when the downlink sub-frame is received. Based on the outcome of the monitoring operation, the transmitted power difference checking operation (i.e. the transmitted power difference checking method 900) is performed in a time interval T4 when the uplink sub-frame is transmitted. Then, based on the outcome of the transmitted power difference checking operation, the power protection scheme 1000 is performed before the transmission of the uplink sub-frame, i.e., in a time interval T5 of the transmit transition gap.

Briefly, according to the present invention, it can be determined whether an antenna is coupled to a corresponding signal port correctly, wherein some of the preferred embodiments are arranged to detect a signal quality of a received signal to determine if an antenna is coupled to the corresponding signal port correctly, and some of the preferred embodiments are arranged to detect a signal quality of a received signal in conjunction with a power difference between a detected power and the transmitted power of a transmitted signal to determine if an antenna is coupled to the corresponding signal port correctly. Then, by controlling the power amplifying circuit having an antenna that is not coupled to its signal port correctly to stop generating the transmitting signal, by or limiting the maximum power of the transmitted signal to the predetermined power level, the power amplifying circuit can be prevented from burning out or deterioration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transceiving module, comprising:
a first antenna;

a first signal port;
a first processing circuit, coupled to the first signal port and arranged to detect a first signal quality of a first received signal received from the first signal port;
a second antenna; and
a second signal port;
wherein the first processing circuit is further coupled to the second signal port and arranged to detect a second signal quality of a second received signal received from the second signal port, and the first processing circuit is arranged to refer the first signal quality and the second signal quality to select one of a physical carrier to interference-plus-noise ratio (PCINR) checking operation and a received signal strength indication (RSSI) checking operation to determine if the first antenna is coupled to the first signal port correctly and the second antenna is coupled to the second signal port correctly.

2. The signal transceiving module of claim 1, wherein when the first processing circuit detects that the first signal quality is lower than a predetermined quality level, the first processing circuit determines that the first antenna is not coupled to the first signal port correctly.

3. The signal transceiving module of claim 2, further comprising:
a first power amplifying circuit, coupled to the first signal port and arranged to generate a transmitting signal;
wherein when the first processing circuit detects that the first antenna is not coupled to the first signal port correctly, the first processing circuit further stops the first power amplifying circuit from generating the transmitting signal.

4. The signal transceiving module of claim 2, further comprising:
a first power amplifying circuit, coupled to the first signal port and arranged to generate a transmitting signal;
wherein when the first processing circuit detects that the first antenna is not coupled to the first signal port correctly, the first processing circuit further limits a maximum power of the transmitting signal to a predetermined power level.

5. The signal transceiving module of claim 1, wherein when the first processing circuit detects that the first signal quality is higher than a predetermined quality level, the first processing circuit determines that the first antenna is coupled to the first signal port correctly.

6. The signal transceiving module of claim 1, wherein when the first processing circuit detects that the first signal quality is higher than a predetermined quality level, the first processing circuit stops detecting the first signal quality of the first received signal.

7. The signal transceiving module of claim 1, wherein the first signal quality of the first received signal is a received signal strength indication (RSSI), a physical carrier to interference-plus-noise ratio (PCINR), or a signal-to-noise (SNR) of the first received signal.

8. The signal transceiving module of claim 1, wherein when the first processing circuit detects that the first signal quality and the second signal quality are both lower than a predetermined quality level, the first processing circuit performs the physical carrier to interference-plus-noise ratio (PCINR) checking operation upon the first received signal and the second received signal to check if the first antenna and the second antenna are respectively coupled to the first signal port and the second signal port correctly, and when the first processing circuit detects that at least one of the first signal quality and the second signal quality is not lower than the predetermined quality level, the first processing circuit performs the received signal strength indication (RSSI) checking operation upon the first received signal and the second received signal to check if the first antenna and the second antenna are respectively coupled to the first signal port and the second signal port correctly.

9. The signal transceiving module of claim 8, wherein when the first processing circuit detects that the first signal quality and the second signal quality are both lower than the predetermined quality level, the first processing circuit subtracts a physical carrier to interference-plus-noise ratio of the first received signal from a physical carrier to interference-plus-noise ratio of the second received signal to check if a difference is larger than a first threshold, and to check if the physical carrier to interference-plus-noise ratio of the first received signal is smaller than a second threshold; and when the difference is larger than the first threshold and the physical carrier to interference-plus-noise ratio of the first received signal is smaller than the second threshold, the first processing circuit determines that the first antenna is not coupled to the first signal port correctly.

10. The signal transceiving module of claim 8, wherein when the first processing circuit detects that at least one of the first signal quality and the second signal quality is not lower than the predetermined quality level, the first processing circuit subtracts a received signal strength indication of the first received signal from a received signal strength indication of the second received signal to check if a difference is larger than a threshold; and when the difference is larger than the threshold, the first processing circuit determines that the first antenna is not coupled to the first signal port correctly.

11. The signal transceiving module of claim 1, further comprising:
a power amplifying circuit;
a switching circuit, arranged to selectively couple the first signal port to the first processing circuit or the power amplifying circuit, wherein when the first processing circuit determines that the first antenna is not coupled to the first signal port correctly, the switching circuit couples the first signal port to the power amplifying circuit;
a second processing circuit, coupled to the power amplifying circuit, the second processing circuit arranged to control the power amplifying circuit to output a transmitting signal having a first predetermined power level to the first signal port when the power amplifying circuit is coupled to the first signal port; and
a power detector, coupled to the second processing circuit and arranged to detect a power level at the first signal port when the power amplifying circuit outputs the transmitting signal;
wherein the second processing circuit further determines if the power amplifying circuit is coupled to the first antenna correctly according to a power difference between the power level and the first predetermined power level.

12. The signal transceiving module of claim 11, wherein when the second processing circuit detects that the power amplifying circuit is not coupled to the first antenna correctly and the power amplifying circuit is not to be used in a normal operation of the signal transceiving module, the second processing circuit further stops the power amplifying circuit from generating the transmitting signal.

13. The signal transceiving module of claim 11, wherein when the second processing circuit detects that the power amplifying circuit is not coupled to the first antenna correctly and the power amplifying circuit is to be used in a normal operation of the signal transceiving module, the second processing circuit further limits a maximum power of the transmitting signal to a second predetermined power level.

14. The signal transceiving module of claim 11, wherein when the second processing circuit detects that the power difference is not larger than a predetermined power difference level, the second processing circuit determines that the power amplifying circuit is coupled to the first antenna correctly.

15. The signal transceiving module of claim 11, wherein when the second processing circuit detects that the power difference is not larger than a predetermined power difference level, the second processing circuit stops determining if the power amplifying circuit is coupled to the first antenna correctly.

* * * * *